(12) United States Patent
Derouet et al.

(10) Patent No.: US 7,945,221 B2
(45) Date of Patent: May 17, 2011

(54) TRANSMITTER DEVICE WITH QUASI-CONSTANT LO LEAKAGE, FOR WIRELESS COMMUNICATION EQUIPMENT WITH A DIRECT CONVERSION ARCHITECTURE

(75) Inventors: Patrice Derouet, Teloche (FR); Fabien Hubert, Orleans (FR)

(73) Assignee: NXP B.V., Eindhoven (NL)

( * ) Notice: Subject to any disclaimer, the term of this patent is extended or adjusted under 35 U.S.C. 154(b) by 271 days.

(21) Appl. No.: 11/917,044

(22) PCT Filed: Jun. 21, 2006

(86) PCT No.: PCT/IB2006/052001
§ 371 (c)(1),
(2), (4) Date: Jun. 19, 2009

(87) PCT Pub. No.: WO2006/137025
PCT Pub. Date: Dec. 28, 2006

(65) Prior Publication Data
US 2010/0022196 A1 Jan. 28, 2010

(30) Foreign Application Priority Data
Jun. 21, 2005 (EP) ..................... 05300498

(51) Int. Cl.
*H04B 1/02* (2006.01)
(52) U.S. Cl. .......... 455/91; 455/118; 455/114.2
(58) Field of Classification Search ............ 455/91–129; 327/355
See application file for complete search history.

(56) References Cited

U.S. PATENT DOCUMENTS

| | | | | |
|---|---|---|---|---|
| 6,057,714 A * | 5/2000 | Andrys et al. | ................. | 327/357 |
| 6,226,509 B1 * | 5/2001 | Mole et al. | ..................... | 455/91 |
| 6,396,330 B1 * | 5/2002 | Fujii | ............................. | 327/355 |
| 7,242,272 B2 * | 7/2007 | Ham et al. | ..................... | 455/118 |
| 7,460,844 B2 * | 12/2008 | Molnar et al. | ................. | 455/130 |
| 2004/0152437 A1 | 8/2004 | Behzad | | |
| 2006/0057991 A1 | 3/2006 | Behzad et al. | | |
| 2008/0008263 A1 * | 1/2008 | Keerthi et al. | ............. | 455/114.2 |
| 2008/0183098 A1 * | 7/2008 | Denison et al. | ................. | 455/91 |
| 2009/0004993 A1 * | 1/2009 | Rafi et al. | ...................... | 455/323 |

FOREIGN PATENT DOCUMENTS

DE 10234657 A1 2/2004

* cited by examiner

*Primary Examiner* — Lana N Le

(57) ABSTRACT

A transmitter device for wireless communication equipment, comprises at least one path (P1) comprising i) a low-pass filter (LPF 1+, LPF1−) for filtering differential signals and applying a chosen first attenuation to each of them to decrease their amplitudes, ii) a differential transconductor (TC1+, TC1−) arranged for applying a chosen second attenuation to each differential signal coming from the low-pass filter (LPF1+, LPF1−) to decrease its continuous component, and iii) a mixer (M1) for mixing separately the differential signals delivered by the transconductor with local oscillator carriers at a chosen radio frequency to deliver output RF signals to be transmitted. The transconductor (TC1+, TC1−) comprises two original cells (OC) for defining two original signals from the differential signals having the first attenuation, and N first and N second signal copy cells (CC1-CC6) each arranged for generating a copy of one of the original signals. The number of signal copy cells used defines the second attenuation and the first and second attenuations to be applied are chosen so that the value (defined by the offset between the continuous component of the differential signals delivered by the transconductor divided by the amplitude of one of these signals) stays below a chosen maximum value over the whole gain range of the path.

12 Claims, 4 Drawing Sheets

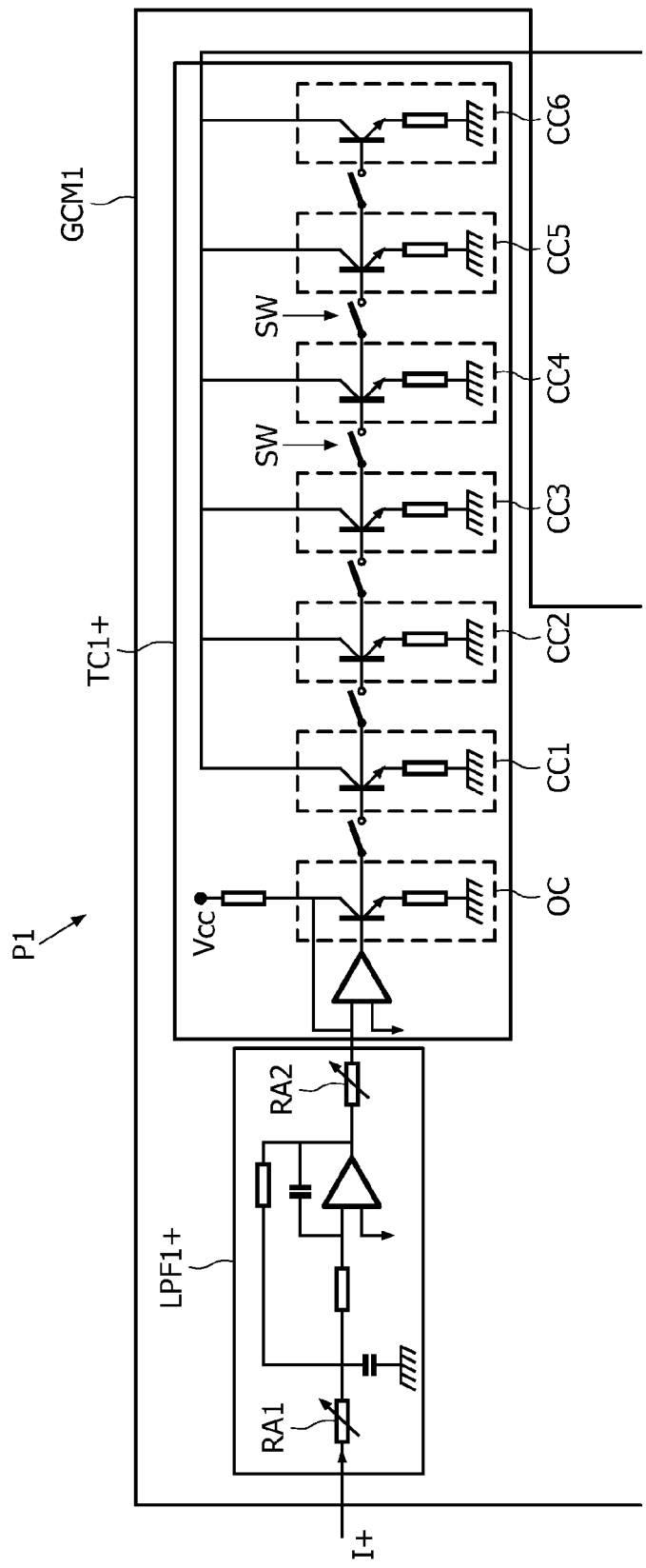
FIG. 2-I
FIG. 2-II

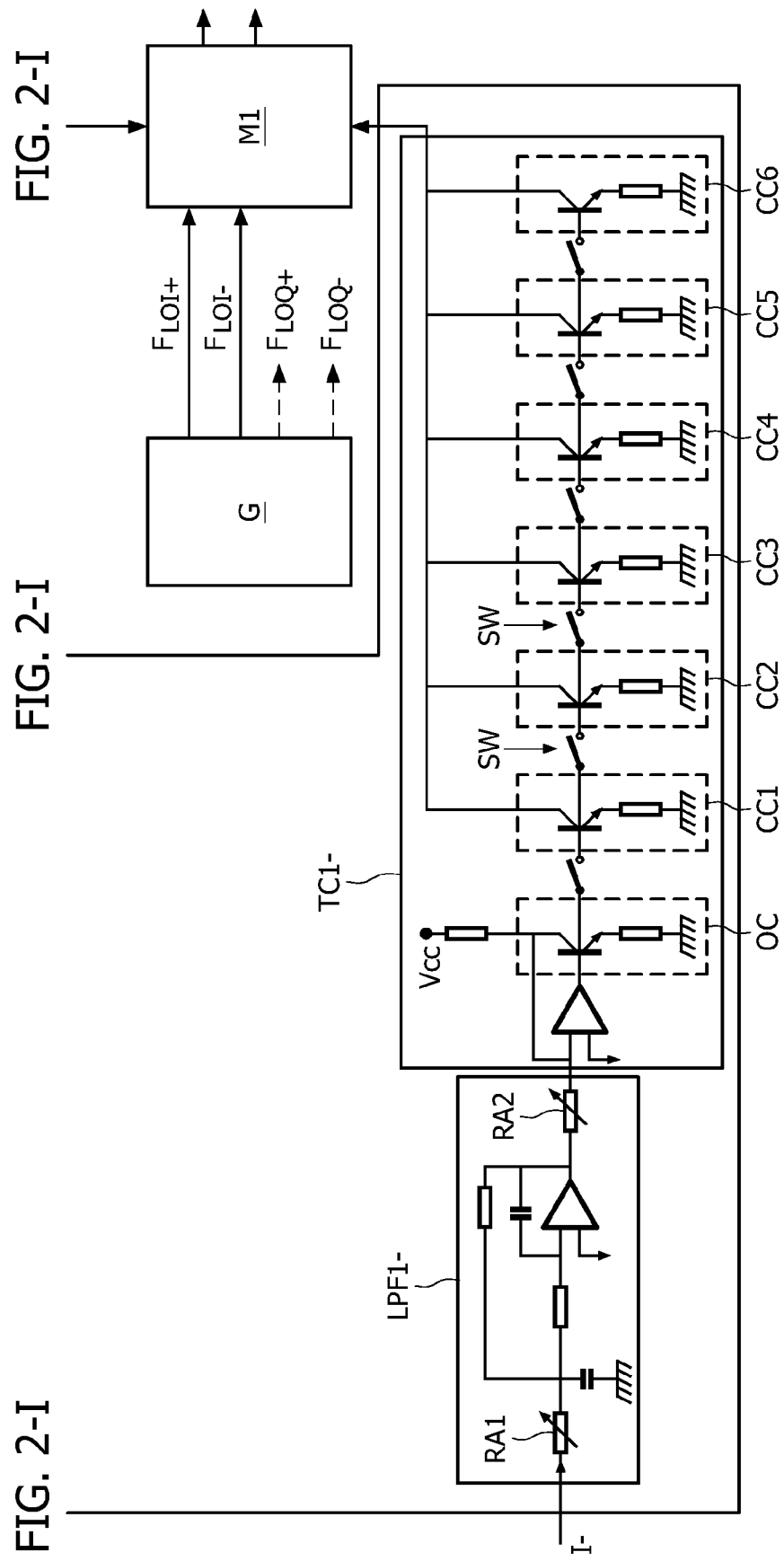

TRANSMITTER DEVICE WITH QUASI-CONSTANT LO LEAKAGE, FOR WIRELESS COMMUNICATION EQUIPMENT WITH A DIRECT CONVERSION ARCHITECTURE

FIELD OF THE INVENTION

The present invention relates to the transmission path of wireless communication equipment, and more particularly to the carrier rejection performance of transmission paths having a direct conversion architecture.

The transmission path of wireless communication equipment mainly comprises a digital baseband processor and a radio frequency (RF) device.

BACKGROUND OF THE INVENTION

The RF device usually comprises a transceiver itself comprising a transmitter TX (circuit or device) and a receiver (circuit or device) RX both driven by local oscillator signals which are output by a dedicated generator. As is well known by the man skilled in the art, in a direct conversion architecture the transmitter comprises:

- an I/Q modulator fed by the baseband processor and outputting (I+, I−) and (Q+, Q−) baseband (modulated) differential signals having an orthogonal phase relationship,
- two paths dedicated to I and Q differential signal processing respectively and each comprising an automatic gain control means fed with the baseband I (or Q) differential signals and delivering baseband I (or Q) differential signals with a chosen gain, and a mixer for mixing the baseband I (or Q) differential signals, delivered by the automatic gain control means, with local oscillator carriers (such as sine and cosine RF carriers) output by a generator and having a frequency $F_{LO}$, in order to convert them into RF signals having a carrier frequency equal to the local oscillator frequency $F_{LO}$,
- an adder for adding the RF signals, and
- a power amplifier for amplifying the RF signals output by the adder and feeding an antenna.

"I signal" is meant to be understood here as an in-phase component signal and "Q signal" is meant to be understood here as a quadrature component signal.

Each automatic gain control means comprises a low-pass filter for filtering the baseband I (or Q) differential signals and applying a chosen first attenuation to each of them in order to decrease their amplitudes, and a differential transconductor for applying a chosen second attenuation to each differential signal coming from the low-pass filter in order to decrease its continuous component (DC).

By varying the combination of the first and second attenuations it is possible to control each path gain. Therefore, the transmitter may output RF signals with a gain chosen in a range, which is for instance equal to 40 dB when the communication network is of the GPRS or EDGE type.

In a direct conversion architecture the baseband I or Q differential signals are directly modulated by the local oscillator (LO) carrier in the mixer. Now, the modulator, being imperfect, introduces a DC offset between the baseband I or Q differential signals it receives, i.e. between I+ and I− or between Q+ and Q−, which necessitates the LO carrier rejection (or leakage) in order for its contribution to be as low as possible.

Some communication networks, such as the GPRS or EDGE ones, impose on the LO carrier that rejection stay below a threshold over the whole gain range. This requirement cannot be satisfied when using a state-of-the-art transmitter. Indeed, when the threshold is equal to −33.2 dB, the requirement is satisfied as long as the introduced attenuation remains smaller than approximately 24 dB, which is far from the maximum attenuation which is 40 dB in the GPRS or EDGE network.

In fact the LO carrier rejection becomes greater than the threshold when the transconductor generates its maximum second attenuation, i.e. when every one of its signal copy cells is used, while at the same time the first attenuation generated by the low-pass filter keeps increasing. In this case, the DC offset between the baseband differential signals (for instance I+ and I−) remains constant while at the same time the amplitude of the I+ or I− decreases. Therefore, the LO carrier rejection keeps increasing.

SUMMARY OF THE INVENTION

So, the object of this invention is to improve the situation.

For this purpose, it provides a transmitter device, for a piece of wireless communication equipment, comprising at least one path comprising i) a low-pass filter for filtering first and second differential signals and applying a chosen first attenuation to each of them to decrease their amplitudes, ii) a differential transconductor arranged for applying a chosen second attenuation to each differential signal coming from the low-pass filter to decrease its continuous component (DC), and iii) a mixer for mixing separately the first and second signals delivered by the transconductor with local oscillator carriers at a chosen radio frequency (RF) to deliver first or second output RF signals to be transmitted.

This transmitter device is characterized in that each transconductor comprises first and second original cells for defining first and second original signals respectively from the first and second differential signals having the first attenuation, and N first and N second signal copy cells each arranged for generating a copy of the first or second original signal, the number of signal copy cells used defining the second attenuation. The first and second attenuations to be applied are chosen so that the value, defined by the offset between the continuous component (DC) of the first and second signals delivered by the transconductor divided by the amplitude of the first or second signal delivered by this transconductor, stays below a chosen maximum value over the whole gain range of the path (i.e. whatever the selected path gain).

The conversion device according to the invention may include additional characteristics considered separately or in combination, and notably:

- N is advantageously greater than or equal to 5. For instance N is equal to 6;
- the low-pass filter may comprise first attenuator means arranged for applying at least two different first attenuations differing from a constant first step, which may be equal to −2 dB, for instance;
- the low-pass filter may also comprise second attenuator means arranged for applying at least two different complementary first attenuations differing from a constant second step which may be equal to −10 dB, for instance;
- each first (I+) and each second (I−) signal copy cell not selected may introduce a chosen third attenuation equal to −6 dB and contribute to the second attenuation;
- it may comprise another path fed by third and fourth differential signals having an orthogonal phase relationship with the first and second differential signals, and comprising a mixer fed with the local oscillator carriers;

it may comprise a generator arranged for generating the local oscillator carriers.

The invention also provides a transceiver for wireless communication equipment comprising a receiver device (or circuit), and a transmitter device (or circuit) such as the one introduced above. It is important to notice that the invention only applies to the transmission part.

The invention may advantageously apply to pieces of equipment, such as mobile telephones, adapted to wireless communications in a communication network of the GSM or GPRS or EDGE or UMTS or WIFI or DECT type or any equivalent wireless network, notably for Origin Offset Suppression (OOS) performance improvements.

BRIEF DESCRIPTION OF THE DRAWINGS

Other features and advantages of the invention will become apparent on examining the detailed specifications hereafter and the appended drawings, wherein.

The appended drawings may not only serve to complete the invention, but also to contribute to its definition, if need be.

DESCRIPTION OF THE PREFERRED EMBODIMENTS

The invention aims at offering a transmitter device (or circuit), for a transmission path of wireless communication equipment having a direct conversion architecture, in which the LO carrier rejection performance is approximately constant over its whole gain range.

"Approximately constant LO carrier rejection performance" is here meant to be understood in the way that the LO carrier rejection stays below a chosen maximum value over the whole gain range (i.e. whatever the selected gain).

In the following description it will be considered that the wireless communication equipment is a mobile (tele)phone, for instance a GSM or GPRS or EDGE or UMTS one, adapted to transmit phase and/or amplitude-modulated signals. But the invention is not limited to this kind of equipment. It may be also a laptop or a PDA (Personal Digital Assistant) comprising a communication device, for instance.

Figure 1:
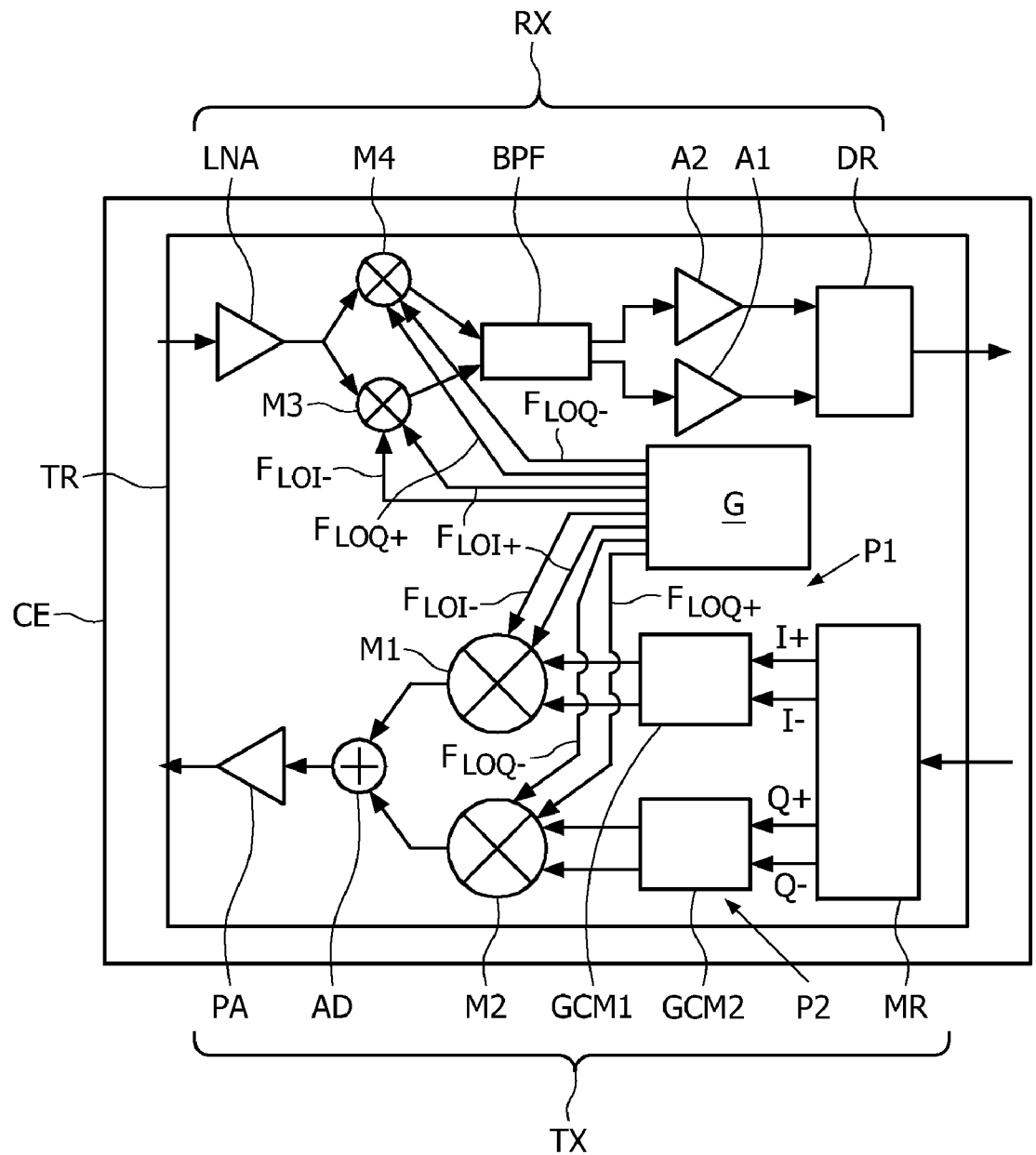
FIG. 1 schematically illustrates a part of wireless communication equipment provided with a transceiver having a direct conversion architecture, FIG. 2 schematically illustrates an example of embodiment of a processing path (P1 for I signals) of a transmitter device according to the invention.

Reference is initially made to FIG. 1 to describe an example of transceiver TR in which the invention may be applied. It is important to notice that the invention does not only apply to the transmission part of a transceiver. It also applies to transmitter circuits used in any type of communication equipment or communication module.

As illustrated in FIG. 1, a transceiver TR comprises a transmitter (device or circuit) TX and a receiver (device or circuit) RX both driven by local oscillator signals output by a generator G.

This generator G may be a voltage-controlled oscillator (VCO) outputting 4 $F_{LO\,I+}$, $F_{LO\,I-}$, $F_{LO\,Q+}$ and $F_{LO\,Q-}$ having frequency $F_{LO}$. $F_{LO\,I+}$ and $F_{LO\,I-}$ are dedicated to I path (P1), while $F_{LO\,Q+}$ and $F_{LO\,Q-}$ are dedicated to Q path (P2). They are in phase quadrature to feed mixers (respectively M1 and M2 in FIG. 1). So in the example illustrated in FIG. 1 the generator G comprises a quadrature block (not shown) at its output.

For instance, the receiver RX (which is not involved in the invention) comprises:

a low noise amplifier LNA receiving signals from the antenna (not illustrated) and outputting I and Q modulated amplified signals, a first mixer M3 for mixing the I modulated signals with a negative $F_{LO-}$ (or positive $F_{LO+}$) local oscillator signal (carrier) output by the generator G and having a frequency $F_{LO}$, a second mixer M4 for mixing the Q modulated signals with a negative $F_{LO-}$ (or positive $F_{LO+}$) local oscillator signal (carrier) output by the generator G and having a frequency $F_{LO}$, a band-pass filter BPF fed with the I and Q modulated signals mixed by the first M3 and second M4 mixers and delivering I and Q filtered modulated signals, first A1 and second A2 amplifiers fed with the I and Q filtered modulated signals respectively and delivering I and Q amplified filtered modulated signals respectively, and an I/Q demodulator DR fed by the first A1 and second amplifier A2 and feeding the baseband processor (not illustrated) with demodulated signals.

The transmitter TX comprises:

an I/Q modulator MR fed by a baseband processor and having a first output for outputting modulated differential signals I+ and I– and a second output for outputting modulated differential signals Q+ and Q–, first P1 and second P2 processing paths dedicated to baseband I and Q differential signal processing respectively and each comprising i) an automatic gain control means GCM1 or GCM2 fed with the baseband I (or Q) differential signals and delivering baseband I (or Q) differential signals with a chosen gain, and ii) a mixer M1 or M2 for mixing the baseband I (or Q) differential signals, delivered by the automatic gain control means GCM1 or GCM2, with the local oscillator carriers $F_{LO+}$ and $F_{LO-}$ output by the generator G, in order to convert them into RF signals having a carrier frequency equal to the local oscillator frequency $F_{LO}$, an adder AD for adding the I and Q RF signals output by the first M1 and second M2 mixers, and a power amplifier PA for amplifying the signals output by the adder AD and feeding the antenna.

It is important to notice that in the case where the transmitter TX has to process only one type of baseband differential signals (I or Q), it has one processing path and therefore does not need any adder.

The first M1 and second M2 mixers may be of any type, for instance Gilbert type mixers. When the transmitter TX is intended for EDGE equipment CE, its modulator MR is a 8PSK I/Q modulator. The type of modulator depends on the network standard. For instance, in the case where the network standard is GPRS the modulator is of the GMSK type.

As it is illustrated in the non-limiting example of FIG. 2, each automatic gain control means GCMi (i=1 and 2) comprises a low-pass filter LPFi and a transconductor module TCi.

More precisely, each automatic gain control means GCMi being arranged for attenuating separately the baseband differential signals (I+, I–) or (Q+, Q–) it receives, comprises two sub-paths dedicated to I+(or Q+) and I– (or Q–) processing respectively and each comprising a low-pass filter LPFi+ or LPFi− and a transconductor module TCi+ or TCi−.

Each low-pass filter LPFij (j=+ or −) is arranged for filtering the baseband Ij (or Qj) differential signal it receives from the modulator MR and for applying a chosen first attenuation to it in order to decrease its amplitude.

For instance and as is illustrated in FIG. 2, each low-pass filter LPFij comprises first RA1 and second RA2 variable attenuator means arranged for applying at least two different complementary attenuations defining together the first attenuation.

Each first variable attenuator means RA1 may be a variable resistive attenuator located at the input of its low-pass filter LPFij and arranged for applying different attenuations differing from a constant first step, which may be equal to −2 dB, for instance. Usually such an attenuator is arranged for applying 0 dB, 2 dB, 4 dB, 6 dB and 8 dB attenuations depending on the selected resistivity.

Each second variable attenuator means RA2 may be a variable resistive attenuator located at the output of its low-pass filter LPFij and arranged for applying different attenuations differing from a constant second step, which may be equal to −10 dB, for instance. Usually such an attenuator is arranged for applying 0 dB, 10 dB, 20 dB and 30 dB attenuations depending on the selected resistance.

Each transconductor module TCij (j=+ or −) is arranged for applying a chosen second attenuation to the baseband Ij (or Qj) filtered differential signal it receives from the corresponding low-pass filter LPFij in order to decrease its continuous component (DC).

Each transconductor module TCij (j=+ or −) comprises an original current cell OC and N current copy cells CCk (k=1 to N) mounted in parallel.

Each original current cell OC is conventionally fed with filtered signals by the corresponding low-pass filter LPFij through an operational amplifier. It comprises a transistor connected to ground through a resistor in order to define an original current (signal) from the differential signal it receives.

Each current copy cell CCk is identical with the original current cell OC to which it is connected (directly or indirectly). It is arranged for generating a copy of the original current defined by the corresponding original current cell OC.

The value of the second attenuation, applied by a transconductor module TCij, is defined by the number of its current copy cells CCk that are used (selected) and therefore contributes to the total current it outputs. As is illustrated in FIG. 2, each current copy cell CCk may be selected by means of a two-state electronic switch SW, whose current state (0 or 1) is defined by the value of a dedicated register.

When the N current copy cells CCk are used, the second attenuation is equal to 0 dB. This is full-scale operation because each transistor brings in its own balance (or contribution). When N-m current copy cells CCk are used ($1 \leq m \leq N$), the second attenuation is equal to mxP (dB), where m is an integer and P a chosen third attenuation, for instance equal to −6 dB.

For instance, if one uses 6 copy cells having a balance sum equal to 4 (0.5+0.5+1+2), and if one wants to obtain −6 dB attenuation, one does not use the copy cell having ×2 balance, which induces a balance sum equal to 2 (0.5+0.5+1) and then an attenuation equal to 20 log(2/4)=−6 dB compared to the full scale. Now, if one wants to obtain −12 dB attenuation, one does not use the copy cells having ×1 and ×2 balances, which induces a balance sum equal to 1 (0.5+0.5) and then an attenuation equal to 20 log (1/4)=−12 dB compared to the full scale.

So a lot of different attenuations may be obtained depending on the number of copy cells that are used and combined together.

With such an arrangement, the gain of a processing path Pi considered depends on the chosen combination of first and second attenuations.

According to the invention, each combination of first and second attenuations is chosen such that the value of a ratio R, representative of the LO carrier leakage, stays below a chosen maximum value over the whole gain range of the processing path Pi considered.

This ratio R is defined by the offset between the continuous component (DC) of the first and second signals (I+ and I−, or Q+ and Q−) respectively, delivered by the transconductor modules TCi+ and TCi−, divided by the amplitude of the first or second signal delivered by these transconductor modules TCi+ and TCi−:

$$R(Ij) = \frac{DC(I+) - DC(I-)}{Ij}$$

or $$R(Qj) = \frac{DC(Q+) - DC(Q-)}{Qj},$$

where $I_j$ and $Q_j$ (j=+ or −) are the amplitudes of the I and Q signals, respectively.

The number N of current copy cells CCk of each transconductor module TCij is also chosen so that the requirement relating to the ratio R be satisfied over the whole gain range of the processing path Pi considered, i.e. whatever the selected gain of the processing path.

When the transmitter TX is intended for GPRS or EDGE equipment CE, each of its transconductor modules TCij comprises at least 5 current copy cells CCk (N≧5). An example of embodiment in which each transconductor module TCij comprises 6 current copy cells CC1 to CC6 is illustrated in FIG. 2. It is important to notice that N may be equal to 5, 7 or 8, or even more, if necessary. What is important is that each combination of first and second attenuations, defining the gain and defined by the selected resistance(s) of the variable attenuator(s) RA1 and/or RA2 and the number m of selected current copy cells, induces a ratio R (representative of the LO carrier leakage) whose measured value is always smaller than or equal to the chosen maximum value.

When the transmitter TX is intended for EDGE equipment CE, the chosen maximum value of R corresponds to the maximum LO carrier leakage (−33.2 dB), tolerated by the standard. Moreover, this value is correlated with OOS for EDGE equipment, and this OOS needs to be compliant (better than 30 dB) over the complete transmit power range with the antenna output, which explains why the I and Q signal amplitudes are varying and why attenuations are needed. In addition to this, a margin is needed and this margin depends on the manufacturers of mobiles. For instance, OOS performances are asked to be better than 3 dB compared to the minimum requirements (2 times in linear scale). This means an OOS better than 33 dB to reach customer satisfaction.

Figure 3:
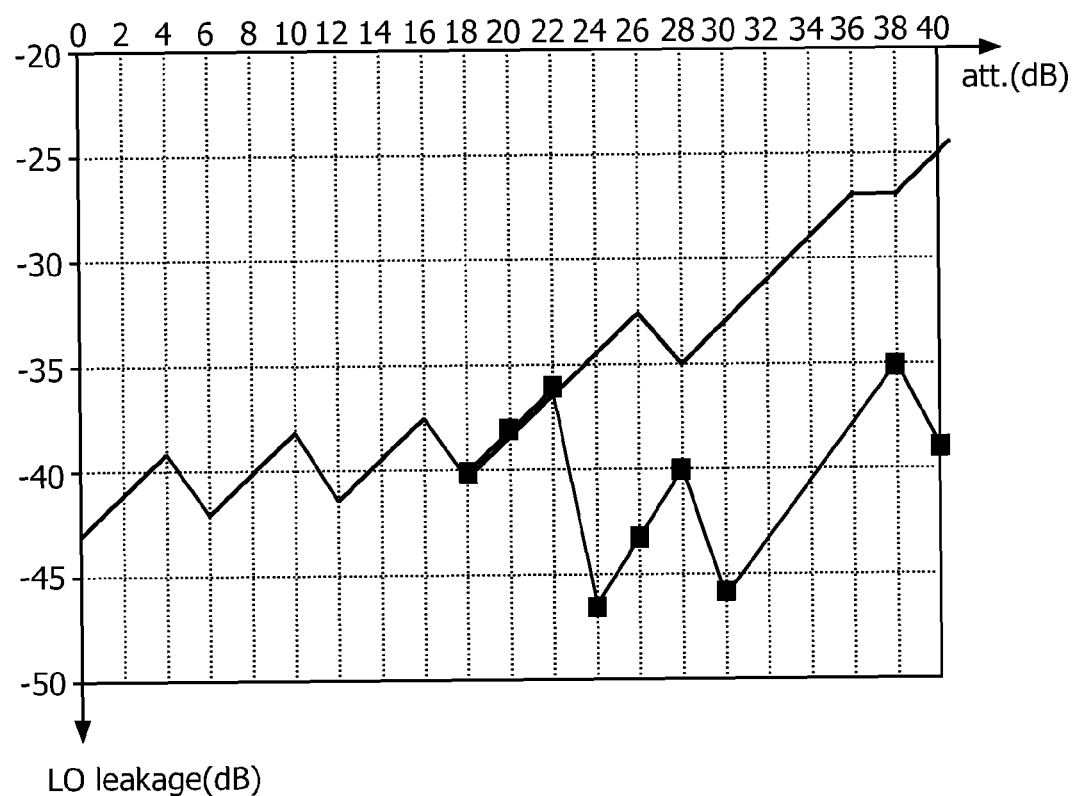
FIG. 3 is a diagram of two Monte Carlo simulations of the LO leakage as a function of the gain, corresponding respectively to a transmitter device of the state of the art (–) and a transmitter device according to the invention (■).

Examples of Monte Carlo simulations illustrating the LO leakage versus the processing path gain are illustrated in the diagram of FIG. 3. More precisely the curve with black squares (■) represents the LO carrier leakage in a transmitter device TX (according to the invention) comprising 6 current copy cells CCk, while the other curve (−) represents the LO carrier leakage in a state-of-the-art transmitter device comprising 4 current copy cells. The combinations of first attenuation (from TCij) and second attenuation (from RA1 and RA2 of LPFij), used to determine the curves of FIG. 3, are detailed in the following Table 1 (state of the art) and Table 2 (invention).

TABLE 1

| Desired attenuation (dB) | Current copy cell Attenuation (dB) | Second filter Attenuation (dB) | First filter Attenuation (dB) |
|---|---|---|---|
| 0  | 0  | 0  | 0 |
| 2  | 0  | 0  | 2 |
| 4  | 0  | 0  | 4 |
| 6  | 6  | 0  | 0 |
| 8  | 6  | 0  | 2 |
| 10 | 6  | 0  | 4 |
| 12 | 12 | 0  | 0 |
| 14 | 12 | 0  | 2 |
| 16 | 12 | 0  | 4 |
| 18 | 18 | 0  | 0 |
| 20 | 18 | 0  | 2 |
| 22 | 18 | 0  | 4 |
| 24 | 18 | 0  | 6 |
| 26 | 18 | 0  | 8 |
| 28 | 18 | 10 | 0 |
| 30 | 18 | 10 | 2 |
| 32 | 18 | 10 | 4 |
| 34 | 18 | 10 | 6 |
| 36 | 18 | 10 | 8 |
| 38 | 18 | 20 | 0 |
| 40 | 18 | 20 | 2 |

TABLE 2

| Desired attenuation (dB) | Current copy cell attenuation (dB) | Second filter Attenuation (dB) | First filter Attenuation (dB) |
|---|---|---|---|
| 0  | 0  | 0 | 0 |
| 2  | 0  | 0 | 2 |
| 4  | 0  | 0 | 4 |
| 6  | 6  | 0 | 0 |
| 8  | 6  | 0 | 2 |
| 10 | 6  | 0 | 4 |
| 12 | 12 | 0 | 0 |
| 14 | 12 | 0 | 2 |
| 16 | 12 | 0 | 4 |
| 18 | 18 | 0 | 0 |
| 20 | 18 | 0 | 2 |
| 22 | 18 | 0 | 4 |
| 24 | 24 | 0 | 0 |
| 26 | 24 | 0 | 2 |
| 28 | 24 | 0 | 4 |
| 30 | 30 | 0 | 0 |
| 32 | 30 | 0 | 2 |
| 34 | 30 | 0 | 4 |
| 36 | 36 | 0 | 0 |
| 38 | 36 | 0 | 2 |
| 40 | 36 | 0 | 4 |

The transceiver TR may be defined on the same chip as the digital baseband processor, or on a separate chip. Moreover, the transmitter device TX according to the invention may be an integrated circuit realized in any technology used in chip making industry.

The invention is not limited to the embodiments of transmitter device and transceiver described above, only as examples, but it encompasses all alternative embodiments which may be considered by one skilled in the art to be within the scope of the claims hereafter.

The invention claimed is:

1. Transmitter device for wireless communication equipment, said device comprising at least one path with a gain range, the path comprising:
   a low-pass filter for filtering first and second differential signals and applying a chosen first attenuation to each of them to decrease the amplitudes thereof;
   a differential transconductor arranged for applying a chosen second attenuation to each differential signal coming from said low-pass filter to decrease its continuous component; and
   a mixer for mixing separately the first and second signals delivered by the transconductor with local oscillator carriers at a chosen radio frequency to deliver first or second output RF signals to be transmitted, characterized in that said transconductor comprises first and second original cells for defining a first and a second original signal respectively from said first and second differential signals having the first attenuation, and N first and N second signal copy cells each arranged for generating a copy of the first or second original signal, the number of signal copy cells used defining said second attenuation, and said first and second attenuations to be applied being chosen so that the value, defined by the offset between the continuous component of the first and second signals delivered by said transconductor divided by the amplitude of the first or second signal delivered by said transconductor, stays below a chosen maximum value over the whole gain range of the path.

2. Transmitter device according to claim 1, characterized in that N is greater than or equal to 5.

3. Transmitter device according to claim 2, characterized in that N is equal to 6.

4. Transmitter device according to claim 1, characterized in that said low-pass filter comprises first attenuator means arranged for applying at least two different first attenuations differing from a constant first step.

5. Transmitter device according to claim 4, characterized in that said constant first step is equal to −2 dB.

6. Transmitter device according to claim 4, characterized in that said low-pass filter comprises second attenuator means arranged for applying at least two different complementary first attenuations differing from a constant second step.

7. Transmitter device according to claim 6, characterized in that said constant second step is equal to −10 dB.

8. Transmitter device according to claim 1, characterized in that each of said N first and N second signal copy cells not selected introduces a chosen third attenuation equal to −6 dB and contributing to said second attenuation.

9. Transmitter device according to claim 1, characterized in that it comprises another path fed by third and fourth differential signals having an orthogonal phase relationship with said first and second differential signals, and comprising a mixer fed with said local oscillator carriers.

10. Transmitter device according to claim 1, characterized in that it comprises a generator arranged for generating said local oscillator carriers.

11. Transceiver for wireless communication equipments, characterized in that it comprises a receiver device and a transmitter device according to claim 1.

12. Use of the transmitter devices and the transceiver according to claim 1 in a communication network of the GSM or GPRS or EDGE or UMTS or WIFI or DECT type.

* * * * *